US008808050B2

(12) United States Patent
Goldmeier

(10) Patent No.: US 8,808,050 B2
(45) Date of Patent: Aug. 19, 2014

(54) MODULAR DISPLAY SYSTEMS

(76) Inventor: Steven Goldmeier, Plainview, NY (US)

(*) Notice: Subject to any disclaimer, the term of this patent is extended or adjusted under 35 U.S.C. 154(b) by 87 days.

(21) Appl. No.: 13/134,306

(22) Filed: Jun. 4, 2011

(65) Prior Publication Data

US 2012/0088429 A1 Apr. 12, 2012

Related U.S. Application Data

(60) Provisional application No. 61/351,973, filed on Jun. 7, 2010.

(51) Int. Cl.
*A63J 19/00* (2006.01)

(52) U.S. Cl.
USPC .............................. 446/82; 446/83; 446/105

(58) Field of Classification Search
USPC ...................... 446/75, 82, 83, 105
See application file for complete search history.

(56) References Cited

U.S. PATENT DOCUMENTS

| | | | | |
|---|---|---|---|---|
| 1,451,108 A * | 4/1923 | Post | ................. | 434/178 |
| 2,182,757 A * | 12/1939 | Gilbert | ................. | 472/77 |
| 2,682,727 A * | 7/1954 | Keljik | ................. | 446/83 |
| 3,577,672 A * | 5/1971 | Nutting | ................. | 446/85 |
| 3,675,362 A * | 7/1972 | DE Gelder et al. | ............. | 446/83 |
| 3,762,788 A * | 10/1973 | Heller | ................. | 312/240 |
| 3,849,930 A * | 11/1974 | Stubbmann | ................. | 446/137 |
| 4,030,235 A * | 6/1977 | Terzian et al. | ................. | 446/296 |
| 4,139,967 A * | 2/1979 | Kuna et al. | ................. | 446/241 |
| 4,161,081 A * | 7/1979 | Katzman et al. | ............. | 446/314 |
| 4,233,778 A * | 11/1980 | Lemelson | ................. | 446/92 |
| 4,356,658 A * | 11/1982 | Goldfarb | ................. | 446/83 |
| 4,575,348 A * | 3/1986 | Wiggs et al. | ................. | 446/310 |
| 4,793,666 A * | 12/1988 | Torrence | ................. | 312/134 |
| 5,055,083 A * | 10/1991 | Walker et al. | ................. | 446/478 |
| 5,261,849 A * | 11/1993 | French | ................. | 446/82 |
| 5,417,603 A * | 5/1995 | De Chazal | ................. | 446/75 |
| 5,542,870 A * | 8/1996 | Westersund | ................. | 446/75 |
| 5,830,033 A * | 11/1998 | Piron | ................. | 446/150 |
| 5,971,826 A * | 10/1999 | Delzompo et al. | ............. | 446/75 |
| 6,039,625 A * | 3/2000 | Wang | ................. | 446/83 |
| 6,146,238 A * | 11/2000 | Daiber | ................. | 446/478 |
| 6,193,581 B1 * | 2/2001 | Wiggs et al. | ................. | 446/330 |
| 6,206,745 B1 * | 3/2001 | Gabai et al. | ................. | 446/91 |
| 6,554,685 B2 * | 4/2003 | Lish | ................. | 446/487 |
| 6,773,329 B2 * | 8/2004 | Hornsby et al. | ............. | 446/475 |
| 6,937,152 B2 * | 8/2005 | Small | ................. | 340/568.1 |
| 7,014,524 B2 * | 3/2006 | Farmer et al. | ................. | 446/82 |
| 7,186,161 B2 * | 3/2007 | Salas Peralta | ............. | 446/108 |
| 7,371,148 B2 * | 5/2008 | Marine et al. | ................. | 446/476 |
| 7,448,932 B2 * | 11/2008 | Buckley et al. | ................. | 446/83 |
| 7,537,509 B2 * | 5/2009 | Payne et al. | ................. | 446/444 |
| 7,618,301 B2 * | 11/2009 | Knight et al. | ................. | 446/75 |
| 8,267,737 B2 * | 9/2012 | Hardin et al. | ................. | 446/175 |
| 2002/0106969 A1 * | 8/2002 | Lish | ................. | 446/487 |
| 2006/0040582 A1 * | 2/2006 | Hopper et al. | ................. | 446/75 |
| 2006/0046603 A1 * | 3/2006 | Colak | ................. | 446/82 |
| 2006/0099876 A1 * | 5/2006 | Buckley et al. | ................. | 446/83 |
| 2006/0189247 A1 * | 8/2006 | Matheus | ................. | 446/75 |
| 2007/0173175 A1 * | 7/2007 | Liss et al. | ................. | 446/476 |
| 2010/0255749 A1 * | 10/2010 | Lines | ................. | 446/72 |
| 2012/0088429 A1 * | 4/2012 | Goldmeier | ................. | 446/82 |

* cited by examiner

*Primary Examiner* — Gene Kim
*Assistant Examiner* — Joseph B Baldori
(74) *Attorney, Agent, or Firm* — Alfred M. Walker

(57) ABSTRACT

There is disclosed a modular display system for use in displaying memorabilia associated with various tales or stories both fictional and non-fictional. The modular display system generally includes a base member and an environmental member mounted on the base member. The environmental member represents the environment and time frame within which the story or tale takes place. One or more removable display members are provided to exhibit various pieces of memorabilia pertaining to the subject tale or story.

15 Claims, 3 Drawing Sheets

MODULAR DISPLAY SYSTEMS

CROSS-REFERENCE TO RELATED APPLICATION

The present application claims the benefit of and priority to U.S. Provisional Patent Application Ser. No. 61/351,973 filed on Jun. 7, 2010, the entire contents of which are incorporated herein by reference.

BACKGROUND

1. Technical Field

The present disclosure relates to modular display systems. More particularly, the present disclosure relates to modular and expandable display systems for displaying memorabilia associated with specific tales, stories, events and/or characters both fictional and nonfictional.

2. Background of Related Art

As people become interested in people, places and events occurring throughout history or become enamored with stories and tales appearing in books and movies both fictional and non-fictional they like to acquire and display memorabilia associated with or representative of those historical events, stories and tales for the enjoyment or education of themselves and others. Over time, the amount of materials acquired and used in these displays can increase or change.

As one becomes more involved in the historical tale or more modern novel or movie, new or additional materials relating thereto may become available or discovered. This can occur from the discovery of additional historical information such as news stories or new information found through manual or interne research, etc. New memorabilia may be marketed to promote the novel or movie. Thus, one may wish to increase the amount of items being displayed.

Additionally, when dealing with movies or novels, sequels are often created introducing new elements such as characters or items used such as, for example cars, boats etc. Thus, one may wish to substitute, expand or change the elements being displayed. Further, the environments within which the tale takes place can change. For example, the settings within which the tale takes place can change from one to another such as from one room or building to another, from one town or city to another or even from one planet to another. Therefore, one may wish to change the environments being displayed as the tale progresses or to capture a particular moment in time.

During the course of the owners displaying the items, the owner may wish to keep certain items set up and ready to be added and/or removed from the display depending on what the owner wishes to display and the audience the owner wishes to display to.

Therefore, a need exists for a display system which is capable of being expanded as new elements become available or are discovered. Further, there exists a need for a modular display system capable of changing as new environments, characters and/or elements are created or changed.

SUMMARY

There is provided a modular display system including a base member, an environmental member provided on the base member and depicting a theme and at least one display member removably attached to the base member. The environmental member is also removably attached to the base member and includes a wall and a shelf projecting from the wall. The wall of the environmental member has varying height sections and at least one opening through which the display member can be viewed. In one embodiment, the wall has an alcove for receipt of figurines or other memorabilia.

The shelf of the environmental member includes an indicia plate to indicate the name of the tale being represented.

In one embodiment, the at least one display member includes a shelf. In another embodiment, the at least one display member is a box. In still another embodiment, the at least on display member includes upper and lower display modules. In a still further embodiment, the at least one display member includes a banner. In yet another embodiment, the at least one display member includes a rotary table.

The environmental member further includes a sensor to actuate various actions provided in the modular display system. The sensor may be a motion sensor, a heat sensor, a light sensor or other known type of sensor.

There is also provided a modular display system for displaying memorabilia associated with a tale and including a base member and at least one display member removably attached to the base member. An environmental member is provided on the base member and depicts a medieval theme. The environmental member includes a forward shelf depicting a moat and a wall member including a draw bridge positioned over the moat. The wall member additionally includes at least one tower. In this embodiment, the environmental member and the at least one display member include stone wall facia.

The modular display system further includes a figurine removably mounted on the environmental member and depicting a medieval character associated with the tale.

There is further provided a method of displaying memorabilia associated with a tale. The method includes providing a base member and an environmental member provided on the base member and depicting a theme related to the tale. The method further includes providing at least one display member removably attached to the base member and positioning at least one element associated with the tale within the at least one display member.

DESCRIPTION OF THE DRAWINGS

Various embodiments of the presently disclosed modular display system are disclosed herein with reference to the drawings, wherein.

DETAILED DESCRIPTION OF EMBODIMENTS

Embodiments of the presently disclosed modular display systems will now be described in detail with reference to the drawings wherein like numerals designate identical or corresponding elements in each of the several views.

Figure 1:
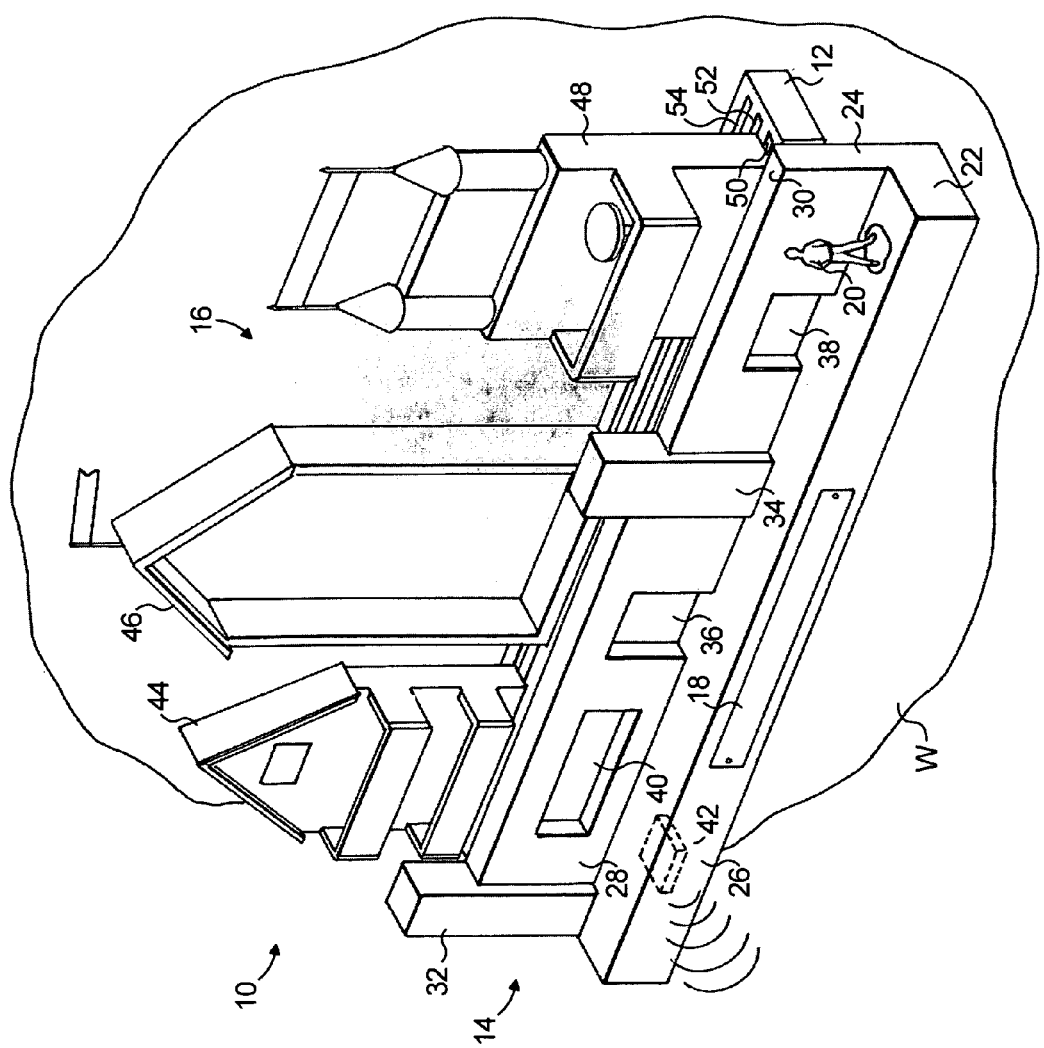
FIG. 1 is a perspective view of one embodiment of a modular display system.
Figure 2:
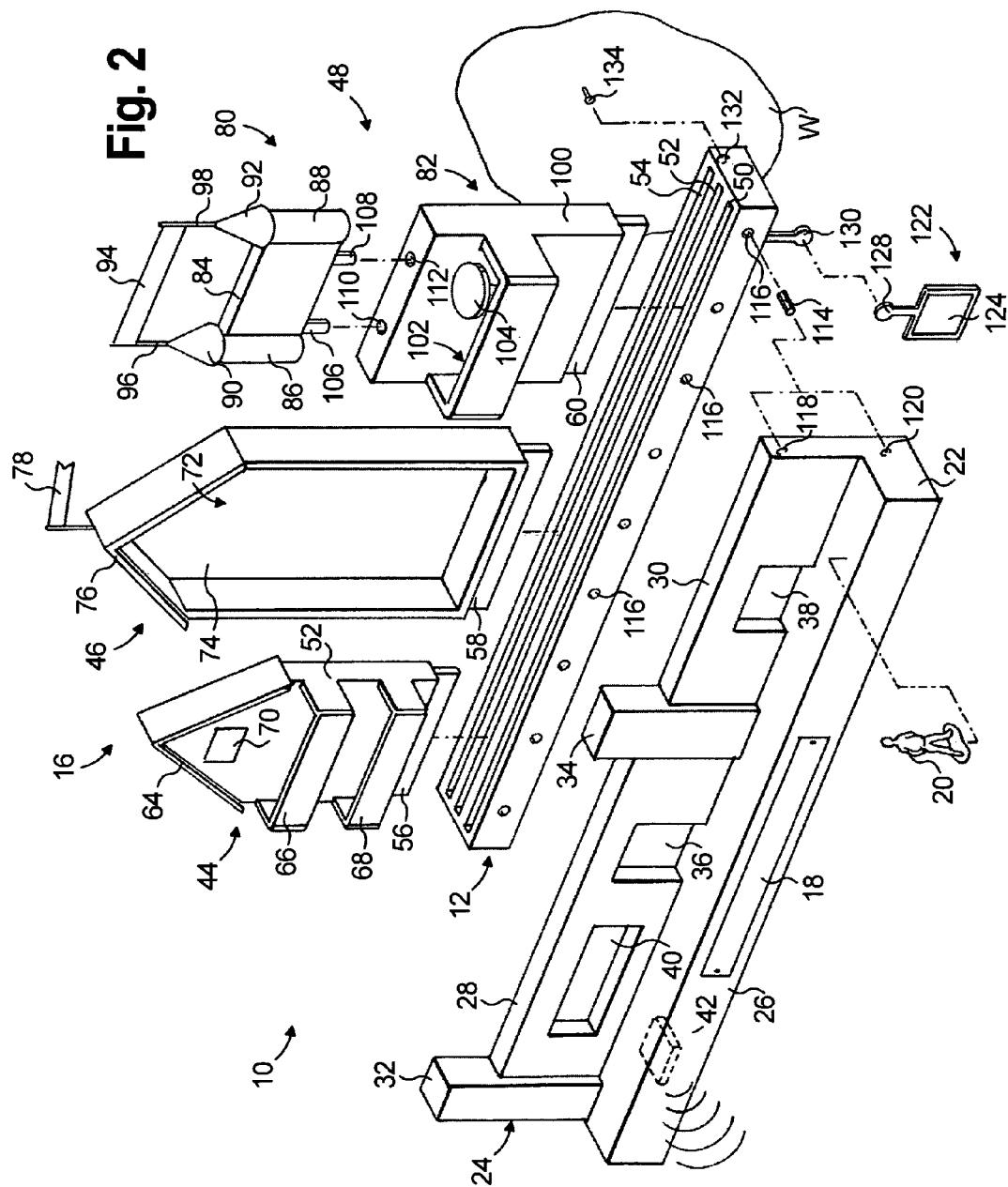
FIG. 2 is a perspective view, with parts separated, of the modular display system of FIG. 1.

FIGS. 1 and 2 illustrate one embodiment of a thematic shelf or modular display system 10. Modular displays system 10 is provided to exhibit various memorabilia associated with specific stories, tales and/or characters. Modular display system 10 serves as a background or backdrop for or against which the tale or story occurred and/or within which the character(s) performed, lived or operated. Modular display system 10 may be attached to a wall W, as described hereinbelow, or may be free standing.

Modular display system 10 generally includes a base member 12, a thematic representation or environmental member 14 and display members 16 removably mounted on base member 12. Environmental member 14 may be formed integrally with base member 12 or may be detachable. An inscription or name plate 18 is provided on environmental member 14 and indicates generally the title of the tale or story or name of a character(s) 20 being displayed. As used herein, the term "character 20" refers to one or more specific characters and/or elements of the specific story or tale being told and represented.

Environmental member 14 is provided to generally illustrate the environment within which character 20 is described or depicted in order to better allow a viewer to understand character 20. For example, environmental member 14 allows a viewer to better appreciate the nature of the environment and time frame within which the story or tale takes place. Environmental member 14 may include, but is not limited to, medieval, ancient or modern cities, forested, urban or suburban landscapes, maritime or extraterrestrial environments, and the like, etc. and may have facia, as described in more detail hereinbelow, to give the proper "feel" to the setting. Environmental member 14 generally includes a forward shelf 22 and a wall section 24 extending upwardly from forward shelf 22.

Name plate 18 is removably provided on a forward edge 26 of forward shelf 22 and is attached by various known means such as, for example, magnetic, removable adhesive, etc. An upper surface 24 of forward shelf 22 serves as a level surface for displaying character 20. Wall section 24 may have a constant or varying height sections, such as, first and second height sections 28 and 30. One or more uprights, such as uprights 32 and 34 may be provided along wall section 24 to depict various environmental elements, such as, for example, towers, trees, buildings, masts, etc.

Additionally, wall section 24 may include one or more openings 36 and 38 through which display members 16 can be viewed and one or more alcoves 40 within which character 20 can be displayed. Environmental member 14 may also include various sensors 42 to activate various visual, motion and/or auditory effects included in modular display system 10. Sensors 42 may include sensors such as, for example, heat, motion, light, sound, etc. type sensors. This enables the various effects of modular display system 10 to be activated as an owner or viewer of modular display system 10 approaches it or a room light switch is turned on and off to illuminate modular display system 10. For example, when sensor 42 is a heat sensor, the approach of an owner, such as a child, will be detected and operational components of modular display system will be automatically activated to the delight of the child.

It should be noted that, while the main components of modular display system 10 are illustrated as being generally rectangular, other shapes are contemplated, such as, for example, oval, circular, sinusoidal, etc. to provide other types of three dimensional viewing of the displayed items.

Display members 16 may include first, second and third display members, 44, 46 and 48, respectively, attached to base member 12. Display members 44, 46 and 48 are removably attached to respective longitudinally extending tracks 50, 52 and 54 formed in base member 12. It should be noted that modular display system 10 can include more or less than three display members 16 and that display members 16 may be removably attached to base member 12 by other means, such as, for example, posts and holes, hook and loop fasteners, etc.

Referring now specifically to FIG. 2, first, second and third display members 44, 46 and 48 include respective tabs 56, 58 and 60 which are received in tracks 50, 52 and 54 of base member 12. Alternatively, display members 44, 46 and 48 may be positioned in the same or alternating tracks 50, 52 and 54 to achieve visual effects of varying depth. First display member 44 includes an upright wall section 62 having a peaked roof 64 and display shelves 66 and 68 projecting from wall section 62. Display shelves 66 and 68 provide surfaces for displaying character 20 or other matter associated with the general theme of modular display system 10. First display member 44 may also include a picture frame 70 for receipt of pictures or scenes specific to character 20 or general to the overall theme.

Second display member 46 includes a shadow box enclosure 72 having a back wall 74 and a peaked roof 76. Enlarged figurines of character 20 can be removably displayed within shadow box enclosure 72. Alternatively, back wall 74 may be formed from a cork board like material to temporally support pictures, press releases, etc. associated to the theme or subject matter of modular display system 10. A flag or pennant 78 may be provided on peaked roof 76 to display a title, time frame, geographic location, etc. of modular display system 10.

Third display member 48 is itself formed from removably attached modules such as upper and lower modules 80 and 82. Upper module 80 includes a connecting display wall 84 and first and second cylindrical members 86 and 88. First and second cylindrical members 86 and 88 include respective conical roofs 90 and 92. A banner 94 may be supported between conical roofs 90 and 92 by poles 96 and 98. Similar to back wall 72 of second display module 46, connecting wall 84 can be used to display memorabilia associated with modular display system 10. Likewise, banner 94 can present items, such as logos, titles, etc.

Lower module 82 of third display member 48 includes a back wall 100 and a rectangular display shelf 102 projecting from back wall 100 for receipt of character 20. Additionally, a rotary table 104 is provided on or within display shelf 102. Rotary table 104 is provided to display figurines of character 20 and allow character 20 to be viewed from all sides. Rotary table 104 may be manually rotated or may be turned by a motor (not shown) activated by sensor 42. Upper module 80 includes pins 106 and 108 which are removably received in respective holes 110 and 112 formed in back wall 100 of lower module 82. Other structure such as, for example, tabs and slots, hook and loop fasteners, etc. may be utilized to attach upper and lower modules 80 and 82, respectively. As shown, tab 60 projects downwardly from back wall 100 of lower module 82 to engage track 54 in base member 12.

As noted hereinabove, environmental member 14 may be removably connected to base member 12. Pins 114 are provided to engage a series of longitudinally extending holes 116 formed in base member 12. Environmental member 14 includes series of similarly oriented longitudinally extending upper and lower holes 118 and 120 to allow environmental member to be attached to base member in two different positions. When pins 114 are positioned in upper holes 118, environmental member 14 is suspended in a low position (FIG. 1) relative to base member 12 so as to allow a direct view of display members 16. When pins 114 are positioned in lower holes 120, environmental member 14 is in a raised position relative to base member 12. This raised position can be desirable in situations where the viewer is directed to look at display members 16 through openings 36 and 38 in order to achieve a more three dimensional view of items displayed in display members 16.

Modular display system 10 additionally includes a hanging picture plate 122 for displaying an image of the "star" of the tale or story or of character 20. Picture plate 122 includes a face 124 for receipt of the image and a frame 126 surrounding face 124. Face 124 can be formed of a material allowing easy removal and exchange of the image. Picture plate 122 includes a hanger 128 which is removably attached to a hanger 130 extending from base member 12. Hanger 128 can be attached to hanger 130 by various methods, such as, for example, magnetic attachment, static attachment, hook and loop fastener, etc.

Base member 12 is attached to wall W by providing holes 132 in base member 12 and hanging base member on pins 134 inserted into wall W.

Figure 3:
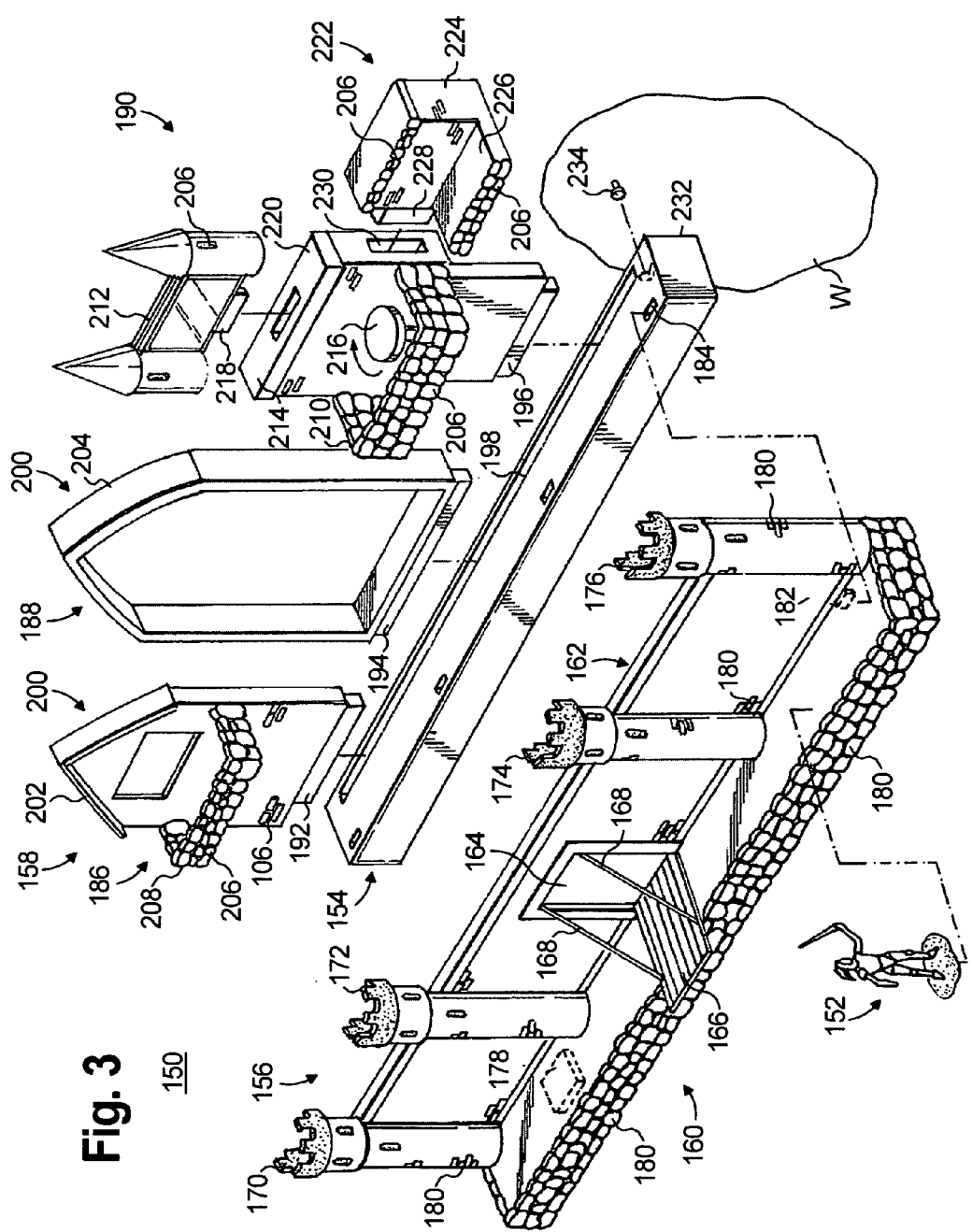
FIG. 3 is a perspective view, with parts separated, of another embodiment of a modular display system.

Referring now to FIG. 3, there is disclosed a specific theme embodiment of a modular display system 150 embodying a medieval theme for displaying memorabilia associated with such historically well known medieval characters 152 as King Arthur, Richard the Lion Heart, Robin Hood, Dracula, fantasy characters, etc. Modular display system 150 generally includes a base member 154, an environmental member 156 and display members 158. It should be noted that the various components of modular display system 150 are substantially similar to those of modular display system 10 above and that the following description is directed to specific environmental adaptations of those components.

Environmental member 156 includes a forward shelf 160 and a wall member 162. Forward shelf 160 resembles a dry or water filled moat and wall member 162 has an opening 164 with a drawbridge 166 extending over the moat. Drawbridge 166 is attached to wall member 162 by cables 168 and can be raised and lowered manually or by motor (not shown). Wall member 162 has a plurality of uprights or towers 170, 172, 174 and 176 as would any respectable medieval castle. A sensor 178 is provided in forward shelf 160 to actuate drawbridge 166 as well as other motion, light and audible components.

In order to get a realistic medieval feel, environmental member 156 is provided with a stone wall facia 180 about at least some of its outer surfaces.

In this embodiment, environmental member 156 includes tabs 182 which are removable received within tab slots 184 formed in base member 154.

Display members 158 include first, second and third display members 186, 188 and 190 substantially similar to first, second and third display members 44, 46 and 48 described hereinabove with respect to modular display system 10. Tabs 192, 194 and 196 extending from respective first, second and third display members 186, 188 and 190 are removably received in a longitudinal track 198 formed in base member 154.

To further provide a medieval "feel", surfaces resembling thatch material 200 are provided on peaked roofs 202 and 204 of first and second display members 186 and 188. Similarly, stone facia representations 206 are provided on various other surfaces, such as, for example, display shelves 208 and 210 of first and third display members 186 and 190, respectively.

Third display member 190 includes upper and lower display modules 212 and 214 similar to display modules 80 and 82 described hereinabove. Lower display module 214 may include a rotary table 216 for displaying character 152. Upper display module 212 includes a tab 218 which is removably received in slot 220 formed in lower display module 214.

In this embodiment, third display member 190 includes a third or side display module 222 having a back wall 224 and a display shelf 226. Side display module 222 is removably attached to lower display module 214 by a tab 228 extending from side display module 222 which is received in a slot 230 formed in lower display module 214. Similar to other components described herein, side display module 222 has a stone facia 206 over some surfaces. While not specifically shown, side display module 222 may include swing doors to provide a cuckoo clock type presentation of memorabilia.

Similar to modular display system 10 described hereinabove, modular display system 150 includes holes 232 formed in base member 154 to hang modular display system 150 on pins 234 inserted into wall W.

It will be understood that various modifications may be made to the embodiments disclosed herein. For example, the various display members may be attached to the base or each other by other methods, such as, for example, pins, hook and loop fastener, etc. Further, the disclosed display devices may include video. Additionally, other environmental factors may be provided, such as, for example, water or wind motion, etc. Still further, more or less or other types of display members may be provided including, for example, hollow or see through members, cylindrical members, etc. Therefore, the above description should not be construed as limiting, but merely as exemplifications of particular embodiments. Those skilled in the art will envision other modifications within the scope and spirit of the present disclosure.

What is claimed is:

1. A method of displaying memorabilia associated with a tale comprising:
    providing a free standing base member having at least one track recess;
    an environmental member removably attachable by a horizontally extending connector to a front surface of the free standing base member and depicting a theme related to a tale;
    said environmental member being attached horizontally in front of said free standing base member,
    said environmental member being a front facade to at least one vertically extending display member, said at least one vertically extending display member having a connector removably attached to said at least one track recess of the free standing base member and said at least one vertically extending display member being located behind and spaced apart from said front facade environmental member;
    said front facade environmental member having at least one opening providing visual access to said at least one vertically extending display member located behind said front facade environmental member;
    providing said environmental member with at least one wall and a shelf projecting therefrom and positioning at least one element associated with the tale within said at least one shelf of said front facade environmental member;
    providing said at least one vertically extending display member with at least one wall and an additional shelf projecting therefrom; and
    positioning at least one additional element associated with the tale within said at least one shelf of the at least one vertically extending display member.

2. The method as recited in claim 1, further comprising the step of providing the wall of said at least one vertically extending display member with varying height sections.

3. The method as recited in claim 2, further comprising the step of providing the wall of said at least one vertically extending display member with an alcove.

4. The method as recited in claim 1 further comprising the step of providing the shelf of said front facade environmental member with an indicia plate.

5. The method as recited in claim 1, wherein the at least one vertically extending display member includes a box.

6. The method as recited in claim 1, further comprising the step of providing the at least one vertically extending display member with upper and lower display modules.

7. The method as recited in claim 1, further comprising the step of providing the at least one vertically extending display member with a banner.

8. The method as recited in claim 1 further comprising the step of providing the at least one vertically extending display member with a rotary table.

9. The method as recited in claim 1, further comprising the step of providing the front facade environmental member with a sensor.

10. The method as recited in claim 9, wherein the sensor is a motion sensor.

11. The method as recited in claim 9, wherein the sensor is a heat sensor.

12. The method as recited in claim 9, wherein the sensor is a light sensor.

13. The method of displaying memorabilia associated with a tale as in claim 1 further comprising the steps of:
depicting a medieval theme, upon said front facade environmental member and said at least one vertically extending display member; providing a forward shelf depicting a moat upon said front facade environmental member and providing said front facade environmental member with a wall member including a draw bridge positioned over the moat and at least one tower.

14. The method as recited in claim 13, further comprising the step of providing the front facade environmental member and the at least one vertically extending display member with simulated stone wall facia.

15. The method as recited in claim 13, further comprising the step of providing a removably mountable figurine on the front facade environmental member and depicting a medieval character.

* * * * *